(12) United States Patent
Smelko et al.

(10) Patent No.: US 8,057,896 B2
(45) Date of Patent: Nov. 15, 2011

(54) PULL-TAB SEALING MEMBER WITH IMPROVED HEAT DISTRIBUTION FOR A CONTAINER

(75) Inventors: Joseph Smelko, Cornwall (CA); Robert William Thorstensen-Woll, Barrie (CA)

(73) Assignee: Selig Sealing Products, Inc., Forrest, IL (US)

( * ) Notice: Subject to any disclaimer, the term of this patent is extended or adjusted under 35 U.S.C. 154(b) by 1227 days.

(21) Appl. No.: 11/030,275

(22) Filed: Jan. 6, 2005

(65) Prior Publication Data
US 2006/0151415 A1 Jul. 13, 2006

(51) Int. Cl.
*B32B 7/12* (2006.01)
*B32B 15/04* (2006.01)
(52) U.S. Cl. ........ 428/347; 428/343; 428/344; 428/346; 428/349; 428/352; 428/354
(58) Field of Classification Search .................. 428/40.1, 428/343, 354, 344, 346, 347, 349, 352
See application file for complete search history.

(56) References Cited

U.S. PATENT DOCUMENTS

| | | | | |
|---|---|---|---|---|
| 2,838,437 | A * | 6/1958 | Froemming et al. | 427/409 |
| 3,140,196 | A * | 7/1964 | Lacy et al. | 428/215 |
| 4,206,165 | A | 6/1980 | Dukess | |
| 4,407,689 | A * | 10/1983 | Ohtsuki et al. | 156/243 |
| 4,531,649 | A | 7/1985 | Shull | 215/232 |
| 4,741,791 | A | 5/1988 | Howard et al. | |
| 4,744,481 | A | 5/1988 | Morgan, Jr. | 215/329 |
| 4,767,655 | A | 8/1988 | Tschudin-Mahrer | 428/57 |
| 4,793,504 | A * | 12/1988 | Towns et al. | 215/250 |
| 4,815,618 | A | 3/1989 | Gach | 215/232 |
| 4,818,577 | A | 4/1989 | Ou-Yang | 428/36.5 |
| 4,837,061 | A | 6/1989 | Smits et al. | |
| 4,882,208 | A | 11/1989 | Breitscheidel et al. | 428/17 |
| 4,930,646 | A | 6/1990 | Emslander | 215/232 |
| 4,934,544 | A | 6/1990 | Han et al. | |
| 4,960,216 | A | 10/1990 | Giles et al. | 215/232 |

(Continued)

FOREIGN PATENT DOCUMENTS
AT 501 393 A1 8/2006
(Continued)

*Primary Examiner* — Victor Chang
(74) *Attorney, Agent, or Firm* — Fitch, Even, Tabin & Flannery

(57) ABSTRACT

A seal and method of manufacture is provided for sealing containers such as bottles, jars and the like. The seal (i.e., closure) is formed with a lower sheet-like structure having a non-foam, heat-distributing layer thereon. The lower structure includes a foil support layer and has a polymer layer, such as a PET layer disposed on its bottom surface. A heat-activated sealant layer is provided under the bottom surface of the PET layer to bond the seal to a container opening. The non-foam, heat-distributing layer is preferably a polyolefin film. Seals in accordance with preferred embodiments of the invention also include a top portion, which is only partially bonded (directly or indirectly) to the bottom portion, so as to leave a tab portion extending from the seal. The top portion is advantageously bonded from periphery to periphery of the bottom portion and at or slightly offset from the diameter (middle) of the bottom portion. The top portion is advantageously formed with polymer material, such as an ethylene vinyl acetate (EVA) layer, having a layer of PET bonded on the top thereof. A release strip, which can have a release layer coated on the bottom thereof, is adhered to the top or bottom structures and used to prevent the tab from adhering to the lower structure.

13 Claims, 3 Drawing Sheets

U.S. PATENT DOCUMENTS

| | | | |
|---|---|---|---|
| 4,961,986 A | 10/1990 | Galda et al. | 428/201 |
| 5,004,111 A | 4/1991 | McCarthy | 215/232 |
| 5,015,318 A | 5/1991 | Smits et al. | |
| 5,055,150 A | 10/1991 | Rosenfeld et al. | |
| 5,057,365 A | 10/1991 | Finkelstein et al. | |
| 5,071,710 A | 12/1991 | Smits et al. | |
| 5,098,495 A | 3/1992 | Smits et al. | |
| 5,149,386 A | 9/1992 | Smits et al. | |
| 5,178,967 A | 1/1993 | Rosenfeld et al. | |
| 5,197,618 A | 3/1993 | Goth | |
| 5,261,990 A | 11/1993 | Galda et al. | |
| 5,265,745 A | 11/1993 | Pereyra et al. | |
| 5,316,835 A | 5/1994 | Groft et al. | 428/247 |
| 5,372,268 A | 12/1994 | Han | |
| 5,381,913 A | 1/1995 | Peeters | 215/232 |
| 5,514,442 A | 5/1996 | Galda et al. | |
| 5,560,989 A | 10/1996 | Han | |
| 5,598,940 A | 2/1997 | Finkelstein et al. | |
| 5,601,200 A | 2/1997 | Finkelstein et al. | |
| 5,615,789 A | 4/1997 | Finkelstein et al. | |
| 5,669,521 A | 9/1997 | Wiening et al. | |
| 5,702,015 A | 12/1997 | Giles et al. | 215/232 |
| 5,891,555 A | 4/1999 | O'Brien | |
| 5,915,577 A | 6/1999 | Levine | 215/232 |
| 5,975,304 A | 11/1999 | Cain et al. | |
| 6,001,471 A | 12/1999 | Bries et al. | 428/343 |
| 6,082,566 A | 7/2000 | Yousif et al. | |
| 6,096,358 A | 8/2000 | Murdick et al. | |
| 6,131,754 A | 10/2000 | Smelko | 215/232 |
| 6,139,931 A | 10/2000 | Finkelstein et al. | |
| 6,194,042 B1 | 2/2001 | Finkelstein et al. | |
| 6,312,776 B1 | 11/2001 | Finkelstein et al. | |
| 6,378,715 B1 | 4/2002 | Finkelstein et al. | |
| 6,458,302 B1 | 10/2002 | Shifflet | |
| 6,602,309 B2 | 8/2003 | Vizulis et al. | |
| 6,699,566 B2 | 3/2004 | Zeiter et al. | |
| 6,705,467 B1 | 3/2004 | Kancsar et al. | |
| 6,722,272 B2 | 4/2004 | Jud | |
| 6,767,425 B2 | 7/2004 | Meier | |
| 6,866,926 B1 | 3/2005 | Smelko et al. | 428/319.1 |
| 6,902,075 B2 | 6/2005 | O'Brien et al. | |
| 6,916,516 B1 | 7/2005 | Gerber et al. | |
| 6,955,736 B2 | 10/2005 | Rosenberger et al. | |
| 6,974,045 B1 | 12/2005 | Trombach et al. | |
| 7,128,210 B2 | 10/2006 | Razeti et al. | |
| 7,182,475 B2 | 2/2007 | Kramer et al. | |
| RE39,790 E | 8/2007 | Fuchs et al. | |
| 7,316,760 B2 | 1/2008 | Nageli | |
| 7,448,153 B2 | 11/2008 | Maliner et al. | |
| 7,531,228 B2 | 5/2009 | Perre et al. | |
| 7,713,605 B2 | 5/2010 | Yousif et al. | |
| 7,740,927 B2 | 6/2010 | Yousif et al. | |
| 7,819,266 B2 | 10/2010 | Ross et al. | |
| 7,838,109 B2 | 11/2010 | Declerck | |
| 2001/0023870 A1 | 9/2001 | Mihalov et al. | |
| 2002/0068140 A1 | 6/2002 | Finkelstein et al. | |
| 2003/0196418 A1 | 10/2003 | O'Brien | |
| 2004/0109963 A1 | 6/2004 | Zaggia et al. | |
| 2005/0048307 A1 | 3/2005 | Schubert et al. | |
| 2005/0208242 A1 | 9/2005 | Smelko et al. | |
| 2006/0000545 A1 | 1/2006 | Nageli et al. | |
| 2006/0003120 A1 | 1/2006 | Nageli et al. | |
| 2006/0003122 A1 | 1/2006 | Nageli et al. | |
| 2007/0298273 A1 | 12/2007 | Thies et al. | |
| 2008/0026171 A1 | 1/2008 | Gullick et al. | |
| 2008/0103262 A1 | 5/2008 | Haschke | |
| 2008/0156443 A1 | 7/2008 | Schaefer et al. | |
| 2009/0078671 A1 | 3/2009 | Triquet et al. | |
| 2009/0208729 A1 | 8/2009 | Allegaert et al. | |
| 2010/0009162 A1 | 1/2010 | Rothweiler | |
| 2010/0030180 A1 | 2/2010 | Declerck | |
| 2010/0059942 A1 | 3/2010 | Rothweiler | |
| 2010/0116410 A1 | 5/2010 | Yousif | |
| 2010/0155288 A1 | 6/2010 | Harper et al. | |
| 2010/0170820 A1 | 7/2010 | Leplatois et al. | |
| 2010/0213193 A1 | 8/2010 | Helmlinger et al. | |
| 2010/0221483 A1 | 9/2010 | Gonzalez Carro et al. | |
| 2010/0290663 A1 | 11/2010 | Trassl et al. | |
| 2010/0314278 A1 | 12/2010 | Fonteyne et al. | |
| 2011/0000917 A1 | 1/2011 | Wolters et al. | |
| 2011/0005961 A1 | 1/2011 | Leplatois et al. | |
| 2011/0091715 A1 | 4/2011 | Rakutt et al. | |

FOREIGN PATENT DOCUMENTS

| | | |
|---|---|---|
| AT | 11 738 U1 | 4/2011 |
| BR | 8200231 U | 9/2003 |
| BR | 0300992 A | 11/2004 |
| DE | 91 08 868 | 9/1991 |
| DE | 102 04 281 A1 | 8/2003 |
| DE | 10 2006 030 118 B3 | 5/2007 |
| DE | 10 2007 022 935 B4 | 4/2009 |
| DE | 20 2009 000 245 U1 | 4/2009 |
| EP | 0 395 660 B1 | 10/1991 |
| EP | 0 668 221 A1 | 8/1995 |
| EP | 0 534 949 B1 | 10/1995 |
| EP | 0 826 598 A2 | 3/1998 |
| EP | 0 826 599 A2 | 3/1998 |
| EP | 0 835 818 | 4/1998 |
| EP | 0 717 710 B1 | 4/1999 |
| EP | 0 915 026 A1 | 5/1999 |
| EP | 0 706 473 A1 | 8/1999 |
| EP | 0 803 445 B1 | 11/2003 |
| EP | 1 445 209 A1 | 8/2004 |
| EP | 1 834 893 A1 | 9/2007 |
| EP | 1 839 898 A1 | 10/2007 |
| EP | 1 839 899 A1 | 10/2007 |
| EP | 1 857 275 A1 | 11/2007 |
| EP | 1 873 078 A1 | 1/2008 |
| EP | 1 445 209 B1 | 5/2008 |
| EP | 1 918 094 A1 | 5/2008 |
| EP | 1 968 020 A1 | 9/2008 |
| EP | 1 992 476 A1 | 11/2008 |
| EP | 2 230 190 A1 | 9/2010 |
| EP | 2 292 524 A1 | 3/2011 |
| FR | 2 916 157 A1 | 11/2008 |
| FR | 2 943 322 A1 | 9/2010 |
| JP | 2000-255621 A | 9/2000 |
| JP | 2004-315035 A | 11/2004 |
| KR | 10-0711073 B1 | 4/2007 |
| KR | 10-0840926 B1 | 6/2008 |
| KR | 10-0886955 B1 | 3/2009 |
| MX | PA05002905 A | 2/2006 |
| MX | 2010001867 A | 4/2010 |
| TW | 194965 | 11/1992 |
| WO | 96 05055 | 2/1996 |
| WO | 00/66450 A1 | 11/2000 |
| WO | 2006/018556 A1 | 2/2006 |
| WO | 2006/021291 A1 | 3/2006 |
| WO | 2006/108853 A1 | 10/2006 |
| WO | 2007/109113 A2 | 9/2007 |
| WO | 2008/027029 A2 | 3/2008 |
| WO | 2008/027036 A1 | 3/2008 |
| WO | 2008/039350 A2 | 4/2008 |
| WO | 2008/125784 A1 | 10/2008 |
| WO | 2008/125785 A1 | 10/2008 |
| WO | 2008/148176 A1 | 12/2008 |
| WO | 2010/115811 A1 | 10/2010 |
| WO | 2011/039067 A1 | 4/2011 |

* cited by examiner

PULL-TAB SEALING MEMBER WITH IMPROVED HEAT DISTRIBUTION FOR A CONTAINER

FIELD OF THE INVENTION

The invention relates to a pull-tab sealing member for closing the mouth of a container, and more particularly to a pull-tab sealing member with improved heat distribution during induction sealing to the mouth of a container.

BACKGROUND OF THE INVENTION

It is often desirable to seal a bottle, jar or other container with a closure to maintain freshness of the contents thereof or to indicate whether the container has been tampered with. However, it is also desirable that the closure be easy to remove by the user. For example, U.S. Pat. No. 5,433,992, the contents of which are incorporated herein by reference, describes a top-tabbed closure for a container which has a membrane for sealing the container and a sheet which is bonded to the top of the membrane, in a manner which leaves a tab portion of the sheet free. A user seeking to gain access to the contents of the container simply grips the tab with their fingers and by pulling on the tab, which is connected to the sheet, can remove the entire closure and access the contents of the container in a relatively convenient manner.

Referring generally to FIG. 1, a conventional top-tabbed closure is shown generally at the top of a bottle 10 as container seal 100. A cross sectional view of seal 100, taken along line 2-2 of FIG. 1 which is not drawn to scale, is shown in FIG. 2.

Seal 100 includes a lower section 101, comprising a lower layer 110, which is formed of an adhesive, such as a hot melt adhesive or other sealants, for securing seal 100 to the top of bottle 10. Lower section 101 also includes a foil layer 120 and a polyethylene terephthalate (PET) layer 130 between foil layer 120 and sealant 110. Seal 100 also includes an upper section 102. Upper section 102 includes an ethylene vinyl acetate (EVA) layer 170 having a PET top layer 180 disposed thereon. A bottom surface 150 of EVA layer 170 is surface treated and bonded to foil layer 120. Lower surface 150 also bonds a paper release layer 140 to EVA layer 170. Thus, release layer 140 prevents EVA layer 170 from being completely bonded to foil layer 120 at lower surface 150. Lower surface 150 only bonds EVA layer 170 to foil 120 up to a boundary line 160 so as to permit a tab portion 200 to be graspable. However, this bond between upper section 102 and lower section 101 is strong enough, so that pulling tab portion 200 can remove all of seal 100 in one piece.

Conventional container seals exhibit several problems. For example, a paper release or information layer can be sensitive to exposure to moisture. Use of PET release layers alone do not provide a fully satisfactory seal. Corrosion of foil layers can also present a problem. Also, conventional closures typically require containers to have smooth surfaces to insure proper bonding and release.

One particular problem is uneven heating during heat sealing steps. The uneven heating of the heat-activated adhesive is attributed to the uneven distribution of heat between the tabbed and non-tabbed sides of the seal. As a result, one side of the seal is sufficiently adhered to the mouth of the container while the other side is not. The common solution to this problem has been overheating (i.e., oversealing) the seal to ensure that both sides of the seal are adhered to the container. However, this common solution presents additional problems in that the closures will not separate from the container satisfactorily when the tab is pulled which can result in tearing and unsatisfactorily incomplete removal of the seal from the mouth of the container. Likewise, the use of excessive heat can lead to oozing of the sealing adhesive which in turn can adhere the tab to the seal. This unwanted side effect is sometimes referred in the art as "tab grab" which prevents the end user from having easy access to the tab for removal of the seal from the container.

Accordingly, it is an object of the present invention to provide an improved pull-tab sealing-member for a container that overcomes the drawbacks of conventional container seals.

SUMMARY OF THE INVENTION

Generally speaking, in accordance with the invention, a seal and method of manufacture is provided for sealing containers such as bottles, jars and the like. The seal (i.e., closure) is formed with a lower sheet-like structure having a non-foam, heat-distributing layer thereon. The lower structure includes a foil support layer and has a polymer layer, such as a PET film thereunder. A heat-activated sealant layer is provided under the bottom surface of the PET layer to bond (i.e., adhere) the seal to the opening of a container. Depending on the container being sealed, the PET film may be coated with a suitable material that will bond to various container types. The non-foam, heat-distributing layer is a preferably polyolefin film layer. Seals in accordance with preferred embodiments of the invention also include a top portion, which is partially bonded (directly or indirectly) to the bottom portion, so as to leave a tab portion extending from the seal. The top portion is advantageously bonded from periphery to periphery of the bottom portion and at or slightly offset from the diameter (middle) of the bottom portion. The top portion is advantageously formed with polymer material, such as an ethylene vinyl acetate (EVA) layer, having a layer of PET bonded on the top thereof. A release strip, which can have a release layer coated on the bottom thereof can be adhered to the top structures and used to prevent the tab from adhering to the lower structure. The release layer can be formed of PET or silicone release coated PET, paper, nylon or polypropylene.

To form seals in accordance with the invention, a first laminated sheet of bottom section material is laminated to a sheet of top section material after interposing releasing strips between the sheets. The releasing strips can be bonded to the top section material and can be printed with written material or instructions. The bottom of the releasing strips can be coated with a release promoting substance, so as to prevent the top sheet from bonding to the bottom sheet at the location of the tabbing strips. Seals, such as those in the shape of a disc, can then be die cut from the sheets. Each disc has approximately half of its area in plan view comprising a release strip. The result is a seal with adhesive on a bottom side surface and a gripping tab on the top, bonded to half the seal. Such seals can be bonded to the top of containers to seal the contents thereof.

Advantageously, the pull-tab sealing members of the present invention exhibit an improved distribution of heat to the heat-activated adhesive resulting in improved adherence of the sealing member to the container. As a result of the improved sealing characteristics exhibited by the pull-tab sealing members of the invention, disadvantages associated with prior art seals are at least minimized or avoided. These and other advantages of the present invention will become far more apparent from the detailed description set forth below.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 3:
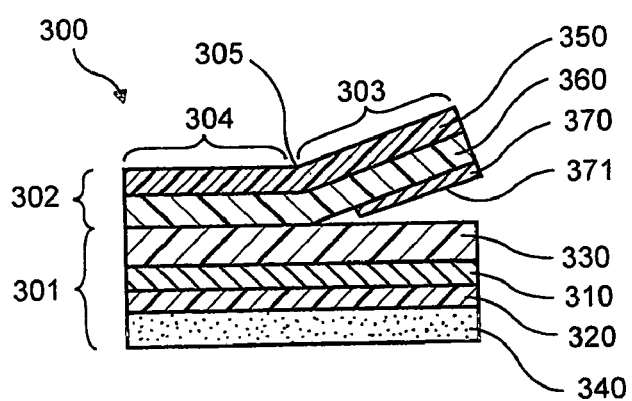
FIG. 3 is a side cross sectional view of a seal in accordance with a preferred embodiment of the invention.

A pull-tab sealing member (i.e., closure) for a container constructed in accordance with a preferred embodiment of the invention is shown generally in FIG. 3 as seal 300. The relative thicknesses of the layers shown in FIG. 3 are not to scale, for purposes of illustration. Furthermore, the construction shown is provided for purposes of illustration only, and is not intended to be construed in a limiting sense.

Seal 300 is constructed from a bottom laminate sheet 301 and a top laminate sheet 302. Bottom sheet 301 includes a metal foil, support layer 310 having a lower polymer layer 320 on the underside thereof and a non-foam, heat-distributing layer 330 on the top surface thereof. Metal foil support layer 310 is preferably aluminum foil although other metals can easily be substituted. Support layer 310 is advantageously about 0.0005 to 0.0020 inches thick.

Lower polymer layer 320 is advantageously formed of polyethylene terephthalate (PET), preferably to a thickness ranging from about 0.0004 to 0.0015 inches. Other suitable materials include nylon, PEN and polypropylene. The bottom surface of lower sheet 301 is advantageously coated with a heat-activated sealant or adhesive 340. The type of adhesive is based in part on the characteristics of the container. Suitable heat-activated adhesives (as used herein, the term sealant will include heat-activated adhesives suitable for adhering a container seal in accordance with invention, to a container) include, but are not limited to, ethylene vinyl acetate, ethylene-acrylic acid copolymers, surlyn and other materials known in the industry.

The top surface of bottom sheet 301 (layer 330) is advantageously provided with a non-foam, heat-distributing layer 330. In accordance with the invention, layer 330 is formed of any non-foam, polymeric material that exhibits insulative properties as well as resistance to tearing or rupturing upon removal of the closure from the sealed container. In a preferred embodiment, the non-foam, heat-distributing layer 330 is a polyolefin film layer. The polyolefin film layer can be a monolayer or a bilayer of two olefin resins co-extruded with a tie layer. Examples of polyolefin resins to be used, include but are not limited to, polyethylene, polypropylene, ethylene-propylene copolymers, blends thereof as wells as copolymers or blends with higher α-olefins. The thickness of the polyolefin film layer is preferably at least about 0.0025 inches (2.5 mil), with at least 0.0030 inches (3 mil) being more preferred and at least 0.0035 inches (3.5 mil) being even more preferred. However, the actual thickness needed to effect even heat distribution and tear resistance is dependent on the type of polyolefin resin used. As will be apparent to one skilled in the art, polymeric properties such as density and melt index are variable and will affect the insulative and tear resistance properties of the material. In one preferred embodiment, the polyolefin resin to be used as the film layer has a density of at least about 0.96 grams/centimeter$^3$ (g/cm$^3$), with 0.97 g/cm$^3$ being more preferred, and 0.98 g/cm$^3$ being even more preferred. Overall, the thickness of the polyolefin film layer should also preferably be no thicker than about 0.010 inches, with no more than 0.008 inches being more preferred. Thicknesses greater than these parameters generally increase the bulkiness of the sealing member, provide minimal additional benefit, and are not cost-effective.

Top laminate sheet 302 is advantageously formed with a polymer support 350, advantageously including a polymer layer 360 on a bottom surface thereof. Support 350 is preferably formed from a strong heat resistant sheet-like material, which can maintain its strength at small thicknesses and which has high pull strength. A preferred material is PET and other suitable materials include PEN and nylon. Polymer layer 360 is advantageously formed of EVA and is advantageously from 0.001 to 0.003 inches thick. EVA is preferred because of its thermal bonding characteristics, such that it readily bonds to layer 330. If layer 360 is too thick, it becomes difficult to achieve satisfactory bonds. If it is too thin, bond strength can be inadequate. Other suitable materials include low density polyethylene, ethylene-acrylic acid copolymers and ethylene methacrylate copolymers.

Top sheet 302 also includes a tab portion 303. Tab portion 303 is not adhered to bottom sheet 301 and can be folded up and away from bottom sheet 301 to provide a gripping tab for removing seal 300 from the top of the container. Top sheet 302 also includes a joining portion 304 which is adhered to bottom sheet 301. A boundary 305 exists at the interface between tab portion 303 and joining portion 304. Boundary 305 advantageously extends in a straight line from edge to edge of seal 300. Boundary 305 is advantageously at or near the middle of seal 300.

The underside of tab 303 advantageously includes a release strip (tabbing strip) 370, preferably having a coat of release material 371 on the underside thereof. Release strip 370 and release coat 371 help prevent tab portions 303 from adhering to the top of bottom sheet 301. Release strip 370 is preferably formed of PET, such as white PET and advantageously includes written material, pictures other information thereon. Other suitable materials include nylon and polypropylene. Release layer 370 is advantageously 0.00045 to 0.0010 inches thick and preferably occupies the entire underside of tab portion 303, substantially up to boundary 305. Suitable materials for release coat 371 include various known heat resistant coatings preferably silicone release coatings.

Bottom sheet 301 is formed by adhering polymer layer 320 to support layer 310 with an adhesive. Polymeric heat-distributing layer 330 can also be adhered to support layer 310 with adhesive. Suitable adhesives include ethylene acrylic acid copolymers, curable two part urethane adhesives and epoxy adhesives. A preferred adhesive is Morton Adcote 522 or Novacote 250. As used herein, the term adhesive will include curable adhesives, heat activated adhesives and thermoplastic adhesives. Top support layer 350 can also be adhered to polymer layer 360 with adhesive.

Figure 6:
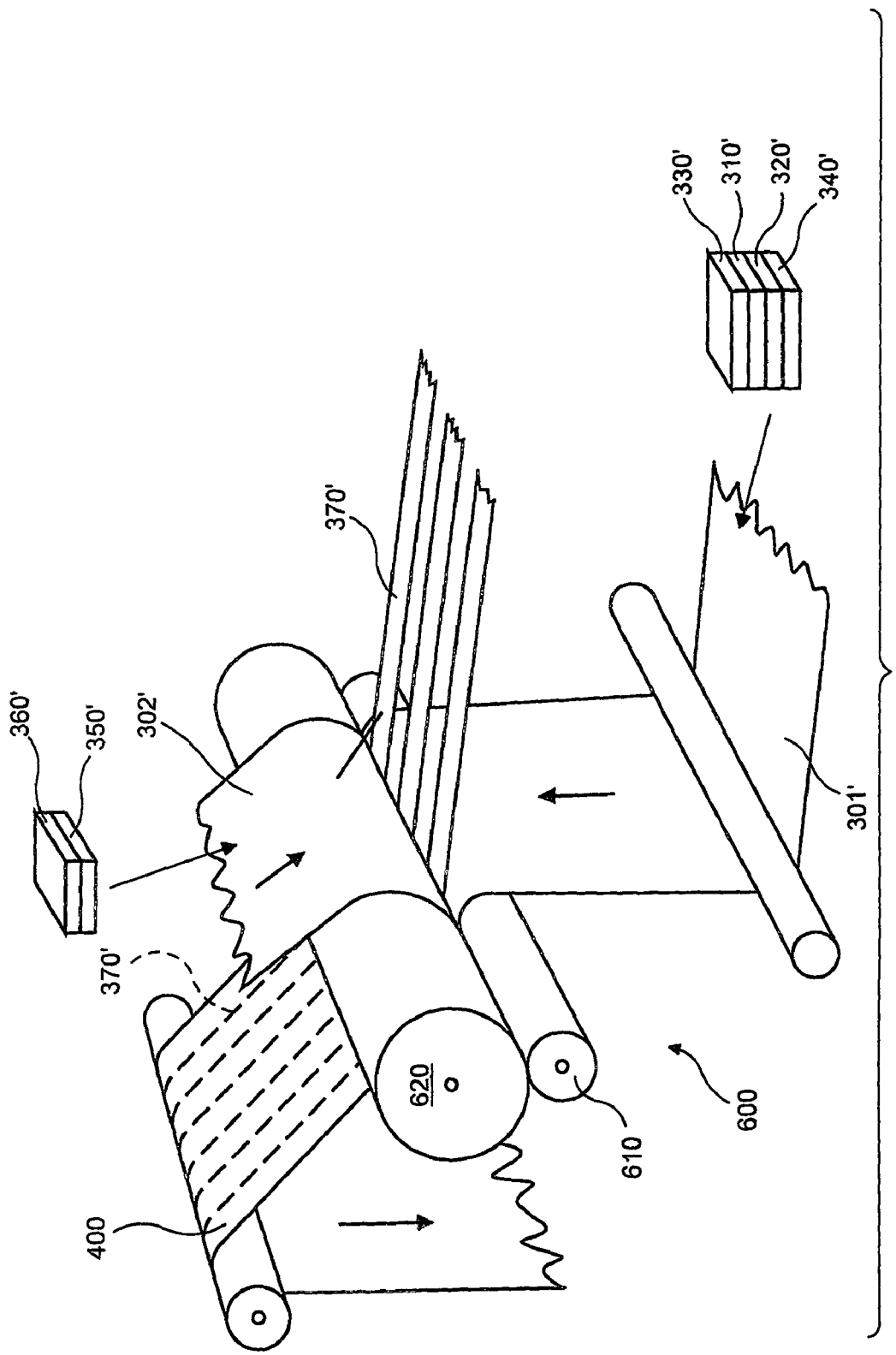
FIG. 6 is a demonstrative perspective view of an apparatus constructing sheets for forming container seals in accordance with a preferred embodiment of the invention.

An apparatus in accordance with a preferred embodiment of the invention for forming a laminated sheet from which seals in accordance with a preferred embodiment of the invention can be obtained is shown generally as apparatus 600 in FIG. 6.

A bottom sheet 301' including a support layer 310' with a top layer of polymeric heat-distributing layer 330' and a bottom polymer coat 320', having sealant 340' on the bottom thereof is fed to the nip where a pressure roll 610 meets a hot roll 620. A top sheet 302' is also fed into the nip between pressure roll 610 and hot roll 620. Top sheet 302' includes a support film 350' and a polymer layer 360' on support film 350. Top sheet 302' is fed into the nip between rolls 610 and 620 so that polymer layer 360' faces non-foam, heat-distributing layer 330'. Release strips (tabbing strips) 370' are combined with and inserted between top sheet 302' and bottom sheet 301' in a parallel spaced arrangement. After heat from hot roll 620 joins top sheet 302', release strips 370' and bottom sheet 301', a laminate sheet 400 results.

Figure 4:
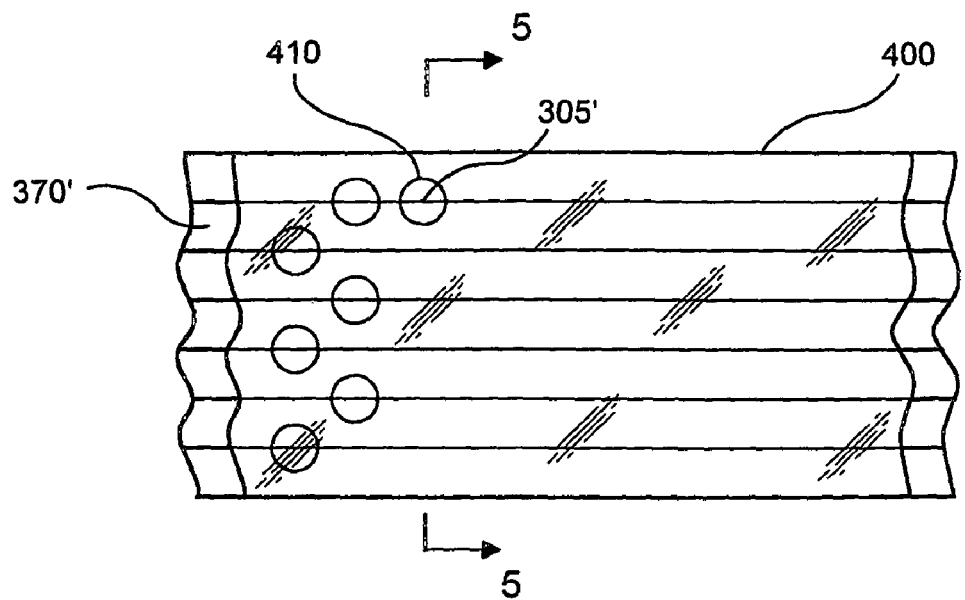
FIG. 4 is a top plan view of a sheet used to form seals in accordance with a preferred embodiment of the invention.
Figure 5:
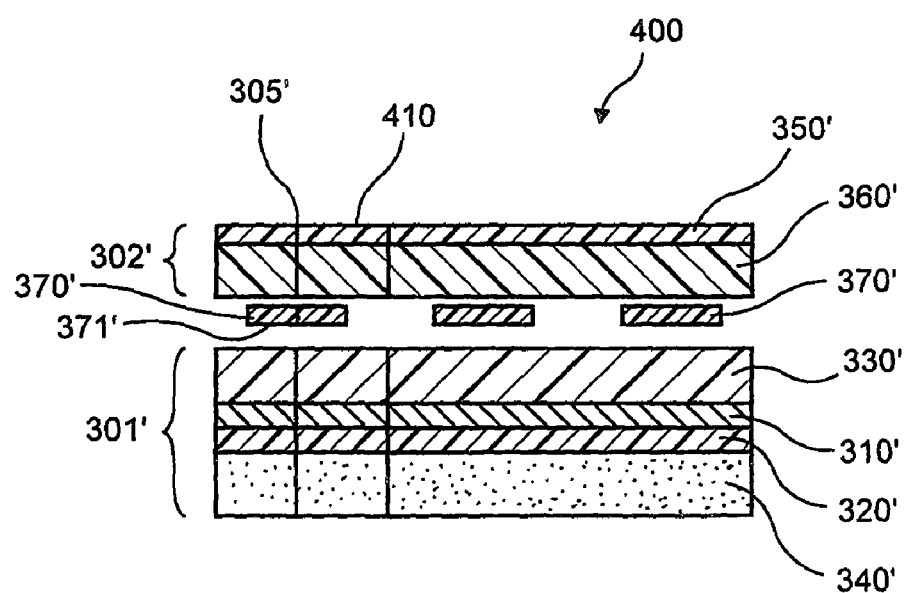
FIG. 5 is a cross sectional view of the sheet of FIG. 4 taken along line 5-5.

Laminate sheet 400 is shown in plan view in FIG. 4 and in cross section in FIG. 5. The relative size of the layers are not shown to scale and top sheet 302' bottom sheet 301' and tabbing strips 370' are not shown in a fully laminated joined structure. Also, adhesive between the layers has not been shown. However, those of ordinary skill in the art would understand how to adhere these multiple layers. To form pull-tab sealing members in accordance with preferred embodiments of the invention, circular (or other appropriately shaped) portions 410 are die cut from sheet 400. As can be see in FIG. 4, a boundary 305' is established at the edge of each release strip 370'. Because the bottom of release strip 370' does not adhere to the top surface of non-foam heat-distributing layer 330', a tab portion will extend from non-foam heat-distributing layer 330' for gripping.

Figure 1:
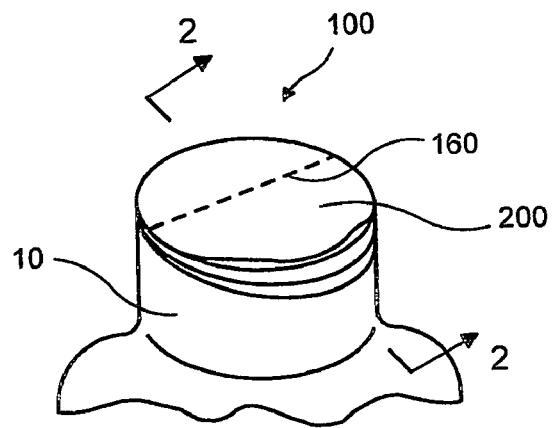
FIG. 1 is a perspective view of a conventional closure disposed over the mouth of a bottle.
Figure 2:
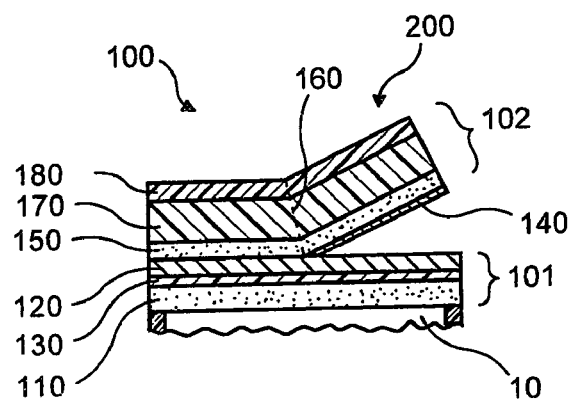
FIG. 2 is a cross sectional view of the closure of FIG. 1 taken along line 2-2.

While not wishing to be limited by theory, it is believed that the advantages offered by the pull-tab sealing members of the invention are achieved by disposing non-foam, heat-distributing layer 330 on the side of metal foil layer 310 opposite from sealant or adhesive layer 340 as illustrated in FIG. 3. The placement of non-foam, heat-distributing layer 330 redirects heat from induction heating of the metal foil evenly towards layer 340. The redistribution of heat results in adhesive or sealant being equally activated on both the tabbed and non-tabbed sides of the pull-tab sealing members of the invention. To the contrary, prior art pull-tab seals as illustrated in FIG. 2 allow heat from the metal foil to escape upwards and away from layer 340 in an uneven manner. The uneven release of heat in the prior art seals is believed due to the different heat transfer characteristics exhibited by the tabbed and non-tabbed sides of the seal. This in turn results in the uneven activation of the adhesive or sealant that causes the uneven sealing exhibited by prior art pull-tab seals as illustrated by FIG. 2.

The pull-tab sealing members of the invention are sealed to the tops of containers using a heat activated adhesive. The adhesive is heated through induction heating of the metal foil support in the bottom sheet of the seal, such as an aluminum foil support sheet. Tabs formed in accordance with the invention, in which the tabbing strip is formed of PET and the non-foam, heat-distributing layer is included on the foil layer at the interface with the top layer, exhibits substantially more even heating and improved sealing.

Moreover, pull-tab sealing members in accordance with the invention will bond to the top surface of containers, without the need to oversize the seal and have portions of the seal extend beyond the top edge of the container, providing a neater appearance. The pull-tab sealing members of the invention also provide adequate sealing even when the top surface of the container was not substantially smooth, such as in the case of containers having mold lines or other imperfections on the top surface thereof. The pull-tab sealing members also exhibit substantially improved water resistance compared to container seals in which paper is exposed or in which a metal foil surface is either exposed or covered with only paper. Thus, the pull-tab sealing members offer the additional advantage of reduced corrosion from exposure to water or juices. An additional benefit of the pull-tab sealing members is that the non-foam heat-distributing layer isolates and thereby inhibits deterioration to the tab portion of the seal when the sealant is heat-activated to adhere the sealing member to a container.

EXAMPLES

The following examples are provided for purposes of illustration only and are not intended to be construed in a limiting sense.

Example 1

A 0.7 mil aluminum foil sheet was adhered to a 0.5 mil PET film with adhesive. A 1.5 mil sealant film was then adhesive laminated to the PET surface of the foil/PET laminate. The three ply laminate was then adhered to a 3 mil polyolefin film layer with urethane adhesive to form a bottom sheet. The olefin film layer was a commercially available resin blend sold under the trade name Imaflex® HD Double White PE, which is a monolayer polyethylene film blend of high density and medium density PE with a 70% by weight high density component. The olefin film was pigmented. The overall density of the film was 0.978 g/cm$^3$. The top sheet was adhered to the bottom sheet with a thermal bonding process after 0.5 mil PET tabbing strips were inserted therebetween. The bottom side of the tabbing strips was coated with a silicone release coating to insure that they did not adhere to the olefin film top layer of the bottom sheet. Circular seals, approximately 1.5 inches in diameter, were die cut from the strips, with the edge of the tabbing sheet extending approximately down the midpoint of the circle, to yield tabs having a base running down the middle of the seals, from edge to edge. The sealing members were induction sealed to containers and produced an even seal.

Example 2

Following the procedure of Example 1, a 0.7 mil aluminum foil sheet was adhered to a 0.5 mil PET film with adhesive. A 1.5 mil sealant film was then adhesive laminated to the PET surface of the foil/PET laminate. The three ply laminate was then adhered to a 3 mil polyolefin film layer, NEX M4129, with urethane adhesive to form a bottom sheet. The NEX (New England Extrusion) M4129 grade film was a monolayer film with a 50% by weight high density component blended with low density polyethylene and a fractional melt index polyethylene. The overall film density was 0.994 g/cm$^3$. The olefin film was pigmented. The top sheet was adhered to the bottom sheet with a thermal bonding process after 0.5 mil PET tabbing strips were inserted therebetween. The bottom side of the tabbing strips was coated with a silicone release coating to insure that they did not adhere to the olefin film top layer of the bottom sheet. Circular seals, approximately 1.5 inches in diameter, were die cut from the strips, with the edge of the tabbing sheet extending approximately down the midpoint of the circle, to yield tabs having a base running down the middle of the seals, from edge to edge. The sealing members were induction sealed to containers and produced an even seal.

Example 3

Following the procedure of Example 1, a 0.7 mil aluminum foil sheet was adhered to a 0.5 mil PET film with adhesive. A 1.5 mil sealant film was then adhesive laminated to the PET surface of the foil/PET laminate. The three ply laminate was then adhered to a co-extruded 3 mil polyolefin film layer, NEX C4349WH, with urethane adhesive to form a bottom sheet. The NEX C4349WH grade film was a co-extruded bilayer of polyethylene/polypropylene resins blended with a plastomer polyolefin for toughness. The overall film density was 0.989 g/cm$^3$. The olefin film was pigmented. The top sheet was adhered to the bottom sheet with a thermal bonding process after 0.5 mil PET tabbing strips were inserted therebetween. The bottom side of the tabbing strips was coated with a silicone release coating to insure that they did not adhere to the olefin film top layer of the bottom sheet. Circular seals, approximately 1.5 inches in diameter, were die cut from the strips, with the edge of the tabbing sheet extending approximately down the midpoint of the circle, to yield tabs having a base running down the middle of the seals, from edge to edge. The sealing members were induction sealed to containers and produced an even seal.

We claim:

1. A pull-tab sealing member, having a top side and a bottom side constructed to be secured to a lip around an opening of a container, to close the container, the pull-tab sealing member comprising:
    a bottom member comprising a metal foil layer having a bottom surface for facing a container and a top surface on an opposite side thereof, a separate non-foam, heat-distributing polyolefin film layer having a top surface and a bottom surface, the bottom surface adhered to the top surface of the metal foil layer by an adhesive selected from the group consisting of ethylene acrylic acid copolymers, curable two part urethane adhesives, epoxy resins, and mixtures thereof, a lower polymer layer disposed on the bottom surface of the metal foil layer including a heat-activated sealant or adhesive coating for securing the bottom member to the container;
    the non-foam, heat-distributing polyolefin film layer includes a blend of a first and a second polyolefin component, a density of the second polyolefin component greater than a density of the first polyolefin component, and a density of the non-foam, heat-distributing polyolefin layer from about 0.96 to about 0.99 g/cc; and
    a top member comprising a top surface and bottom surface, a portion of the top member comprising a tab portion having a top and a bottom surface, the bottom surface of the tab portion not secured to the top surface of the non-foam, heat-distributing polyolefin film layer of the bottom member, and a portion of the bottom surface of the top member secured to the top surface of the non-foam, heat-distributing polyolefin film layer of the bottom member, the top member is secured to the bottom member in a sufficiently strong manner and the non-foam heat distributing polyolefin film layer is of a sufficient thickness so that when the heat-activated sealant or adhesive coating at the bottom surface of the bottom member is secured to a container, the bottom member can be removed by pulling on the tab portion without separating the tab portion from the top member or rupturing the non-foam heat-distributing polyolefin film layer.

2. The pull-tab sealing member of claim 1, wherein the polyolefin is selected from the group consisting of polyethylene, polypropylene, ethylene-propylene copolymers and blends thereof.

3. The pull-tab sealing member of claim 1, wherein the polyolefin film layer is at least about 2.5 mil thick.

4. The pull-tab sealing member of claim 1, wherein a release strip is disposed at the bottom surface of the tab portion, positioned to face a portion of the top surface of the non-foam, heat-distributing polyolefin film layer of the bottom member and constructed to help prevent the tab portion from becoming affixed to the bottom member.

5. The pull-tab sealing member of claim 4, wherein the release strip comprises PET.

6. The pull-tab sealing member of claim 5, wherein the release strip has a layer of release material disposed on the bottom surface thereof facing the non-foam heat-distributing polyolefin film layer, the release material having less of a characteristic to adhere to the non-foam, heat-distributing polyolefin film layer than the PET layer.

7. The pull-tab sealing member of claim 1, wherein the top member comprises a layer of PET and a layer of EVA under the PET layer.

8. The pull-tab sealing member of claim 4, wherein there is written matter on the release strip.

9. The pull-tab sealing member of claim 1, wherein the polyolefin film layer has a density of at least 0.97 g/cm$^3$.

10. A pull-tab sealing member, having a top side and a bottom side constructed to be secured to a lip around an opening of a container, to close the container, the pull-tab sealing member comprising:
    a bottom member comprising a metal foil layer having a bottom surface for facing a container and a top surface on an opposite side thereof, a non-foam, heat-distributing polyolefin layer having a top surface and a bottom surface, the bottom surface adhered to the top surface of the metal foil layer by an adhesive selected from the group consisting of ethylene acrylic acid copolymers, curable two part urethane adhesives, epoxy resins, and mixtures thereof, a lower polymer layer disposed on the bottom surface of the metal foil layer including a heat-activated sealant or adhesive coating so that the non-foam, heat-distributing polyolefin layer is disposed on the opposite side of the metal foil layer from the heat-activated sealant or adhesive coating;
    the non-foam, heat-distributing polyolefin layer has a thickness of about 2.5 to about 10 mils and includes a blend of a first and a second polyolefin component, a density of the second polyolefin component greater than a density of the first polyolefin component, where the blend is about 50 to about 70 percent of the second polyolefin component to form a density of the non-form, heat-distributing layer from about 0.96 to about 0.99 g/cm$^3$ so that the non-foam, heat-distributing polyolefin layer is effective to redirect heat towards the lower polymer layer for securing the heat activated sealant or adhesive coating to the container; and
    a top member comprising a top surface and bottom surface, a portion of the top member comprising a tab portion having a top and a bottom surface, the bottom surface of the tab portion not secured to the top surface of the non-foam, heat-distributing polyolefin layer of the bottom member, and a portion of the bottom surface of the top member secured to the top surface of the non-foam, heat-distributing polyolefin layer of the bottom member, the top member is secured to the bottom member in a sufficiently strong manner, so that when the heat-activated sealant or adhesive coating at the bottom surface of the bottom member is secured to a container, the bottom member can be removed by pulling on the tab portion.

11. The pull-tab sealing member of claim 10, wherein the first polyolefin component is a medium density polyethylene and the second polyolefin component is a high density polyethylene.

12. The pull-tab sealing member of claim 1, wherein the density of the non-foam, heat-distributing polyolefin layer is from about 0.97 to about 0.99 g/cc.

13. The pull-tab sealing member of claim 10, wherein the density of the non-foam, heat-distributing polyolefin layer is from about 0.97 to about 0.99 g/cc.

\* \* \* \* \*